(12) United States Patent
Stiesdal

(10) Patent No.: US 7,980,827 B2
(45) Date of Patent: Jul. 19, 2011

(54) METHOD AND CONNECTING PIECE FOR ASSEMBLING AN ARM, PREFERABLY A WINDMILL ARM, IN SECTIONS

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 1090 days.

(21) Appl. No.: 11/791,298

(22) PCT Filed: Nov. 24, 2005

(86) PCT No.: PCT/EP2005/056189
§ 371 (c)(1),
(2), (4) Date: May 22, 2007

(87) PCT Pub. No.: WO2006/056584
PCT Pub. Date: Jun. 1, 2006

(65) Prior Publication Data
US 2007/0290118 A1    Dec. 20, 2007

(30) Foreign Application Priority Data
Nov. 24, 2004 (DK) ................................ 2004 01823

(51) Int. Cl.
*B64C 11/26* (2006.01)
(52) U.S. Cl. .................................. 416/233; 29/889.71
(58) Field of Classification Search .................. 416/232, 416/233, 132 R, 889.6, 889.61, 889.7, 889.71, 416/889.72; 29/889.6, 889.61, 889.7, 889.71, 29/889.72
See application file for complete search history.

(56) References Cited

U.S. PATENT DOCUMENTS

| | | | |
|---|---|---|---|
| 1,785,318 A | 12/1930 | Lambert | |
| 2,125,882 A * | 8/1938 | Berliner | 244/124 |
| 6,581,343 B1 * | 6/2003 | Metelli | 52/223.9 |
| 2003/0138290 A1 | 7/2003 | Wobben | |
| 2006/0083611 A1 | 4/2006 | Wobben | |
| 2006/0127222 A1 | 6/2006 | Arelt | |

FOREIGN PATENT DOCUMENTS

| | | |
|---|---|---|
| DE | 31 09 566 A1 | 10/1982 |
| EP | 0 258 926 A1 | 3/1988 |
| EP | 1 244 873 B1 | 10/2002 |
| FR | 1.187.166 | 9/1959 |
| GB | 707620 | 4/1954 |
| WO | WO 2004/015265 A1 | 2/2004 |

OTHER PUBLICATIONS

H.Hald et al.; "The DFVLR—25m—Wind Energy Converter"; European Wind Energy Conference; Oct. 22-26, 1984; pp. 102-107.

* cited by examiner

*Primary Examiner* — Edward Look
*Assistant Examiner* — Dwayne J White

(57) ABSTRACT

Method and connecting piece for assembling a first and a second arm section in extension of one another in order thus to form at least a part of an arm, preferably a windmill arm, where two arm sections are connected to at least one connecting piece for mounting between the two arm sections. The connecting piece is provided with a first flange for attachment to the end of the first arm section and a second flange for attachment to the end of the second arm section, the first and the second flange being firmly interconnected. The first and the second flange are each provided with at least one hole for a bolt which extends through the hole from the connecting piece and into the adjacent arm section, this bolt or these bolts securing each arm section to the adjacent flange.

12 Claims, 5 Drawing Sheets

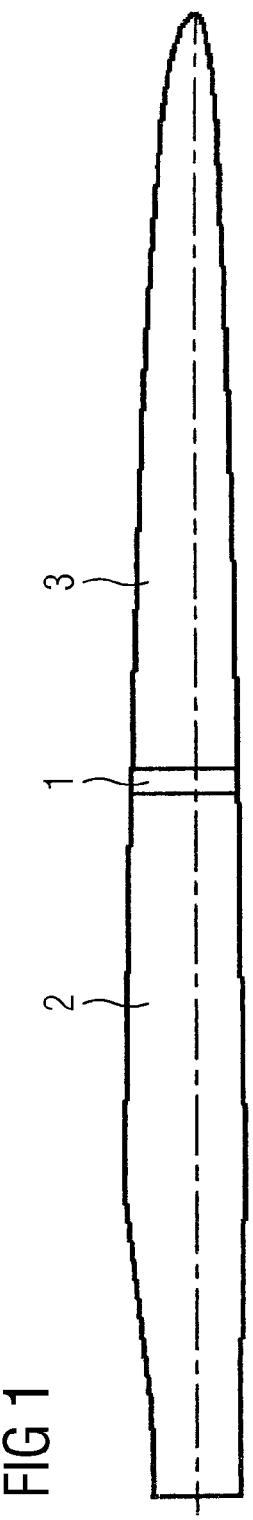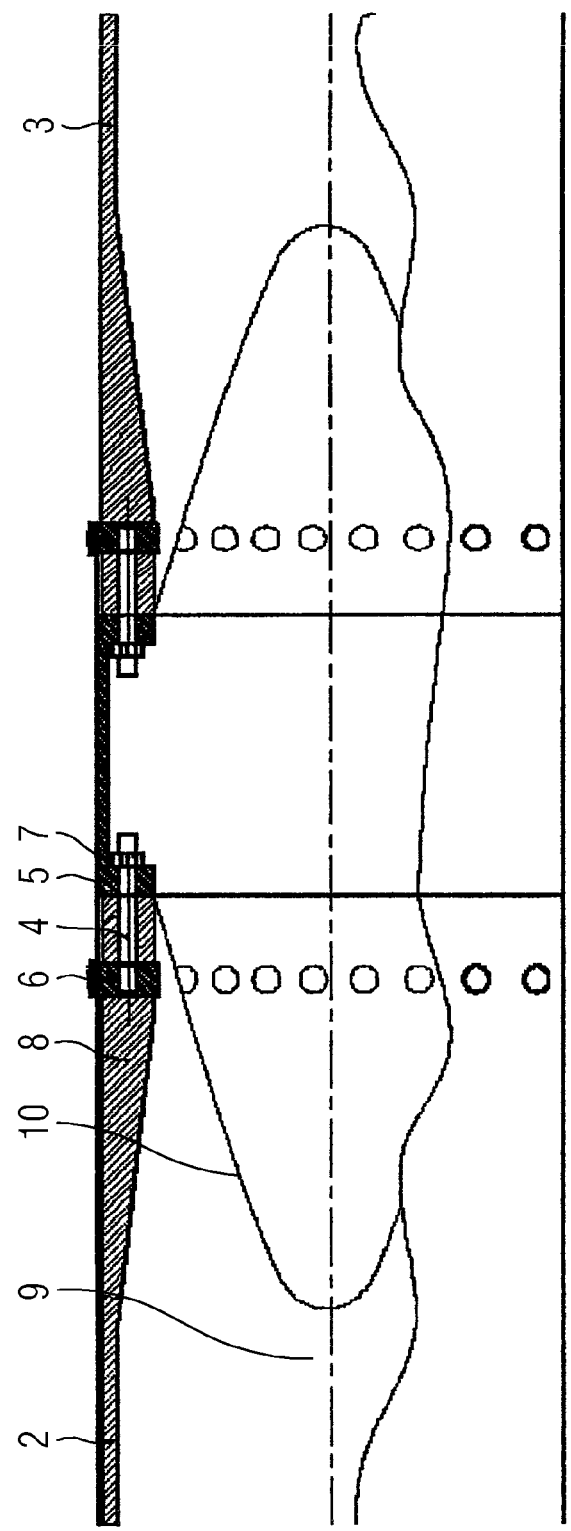

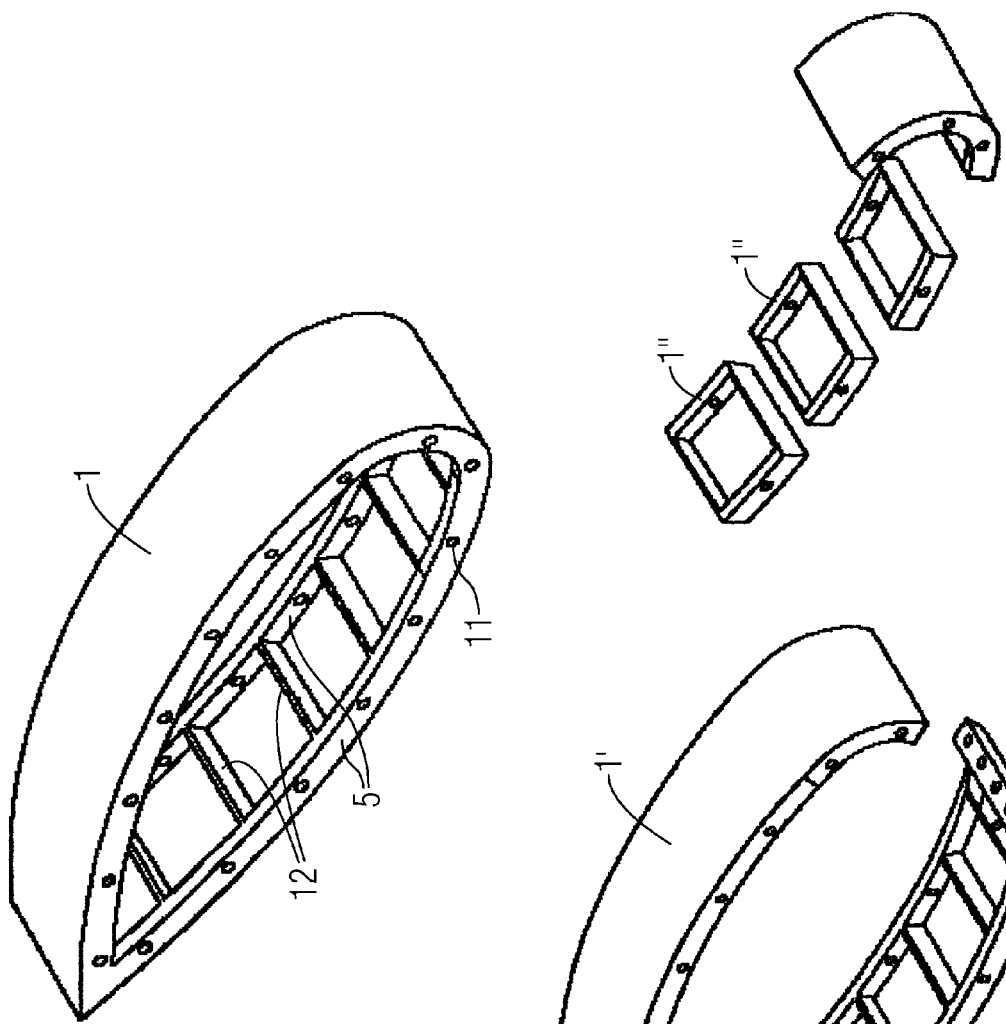

METHOD AND CONNECTING PIECE FOR ASSEMBLING AN ARM, PREFERABLY A WINDMILL ARM, IN SECTIONS

CROSS REFERENCE TO RELATED APPLICATIONS

This application is the US National Stage of International Application No. PCT/EP2005/056189, filed Nov. 24, 2005 and claims the benefit thereof. The International Application claims the benefits of Danish application No. 200401823 filed Nov. 24, 2004, both of the applications are incorporated by reference herein in their entirety.

FIELD OF INVENTION

The present invention relates to a method and a connecting piece for assembling a first and a second section of an arm, preferably a windmill arm, where the sections are joined together in extension of one another in order thus to form at least a part of an arm.

BACKGROUND OF THE INVENTION

The length of windmill arms increases in line with the nominal power of the windmill. For windmills with a nominal power of 3-4 MW and above, arms with lengths of 60 meters or more are used. Such mill arms are difficult to transport on account of this length. It is therefore desirable for it to be possible to transport such arms in sections. However, it is a problem to assemble such sections in a simple way when reproducibility and safety are to be ensured in the assembly, which is subjected to great dynamic stresses and therefore has to be capable of being maintained.

It is known that windmill arms can be manufactured in sections, which are subsequently assembled to form a whole.

In H. Hald et al: "The DFVLR—25 m—Wind Energy Converter", European Wind Energy Conference, 1984, a method is described in which two arm sections in a butt joint are held together with longitudinal bolts which are fastened to nuts fitted in transverse holes in the arm shells. The disadvantage of this method is that there is limited space for the requisite tightening tool at the bolt which is tightened when assembly takes place.

The patent EP 1 244 873 describes a method in which two arm sections in a butt joint are held together with longitudinal metal straps which are prestressed by rotating eccentric bolts. The disadvantage of this method is that the prestressing tolerance is limited and that it is difficult to ensure correct prestressing on account of the great friction in the strap joint.

WO 04015265 describes a method in which two arm sections in a butt joint are held together with a glued-on overlapping plate shaped like an arm profile. The disadvantage of this method is that it involves making a glued joint under field conditions with the associated risks of it not being possible, because of the surrounding conditions, for the joint to be made to the same quality as if it were made under controlled conditions. Furthermore, the arm cannot be separated again, for example in the event of damage which is limited to the outer arm alone, and, in the event of being transported away, the arm joint has to be cut through destructively.

SUMMARY OF THE INVENTION

The object of the invention is to provide a reproducible, safe and maintenance-friendly method for assembling arms, preferably windmill arms, in sections and to describe an apparatus for use in this method.

This object is achieved by a method for assembling a first and a second arm section in extension of one another in order thus to form at least a part of an arm, preferably a windmill arm, the method comprising one or more connecting pieces being mounted between two arm sections. Each connecting piece is provided with a first flange for attachment to the end surface of the first arm section and a second flange for attachment to the end surface of the second arm section, the first and the second flange being firmly interconnected, the first and the second flange each being provided with at least one hole for one or more bolts, and this bolt or these bolts connecting each arm section to the adjacent flange. With such a method using said connecting piece, the desired reproducibility, safety and maintenance-friendliness is achieved in the assembly of the arm sections, even in the case of assembly under field conditions. Outer arm sections can be replaced without inner sections having to be demounted. Arm assembly is on the whole reversible, so arms can be separated again after assembly.

In the method for joining two arm sections together according to the invention, means for fastening one or more bolts are provided in each of the two arm sections. Also provided is a connecting piece in the form of one or more modules provided with a first flange for attachment to the end of the first arm section and a second flange for attachment to the end of the second arm section, the first and the second flange being firmly interconnected. The first and the second flange are each provided with at least one hole for a bolt. When joining together takes place, each of the two arm sections is connected to the connecting piece or the connecting pieces using bolts which are fastened to each arm section in advance or during the assembly process itself and are connected firmly to the connecting piece or the connecting pieces.

In a practical embodiment, the means by which an arm section retains one or more bolts can be brought about by providing the arm section with transverse holes in which nuts for the bolts can be fitted. Such a nut can be made in the form of a cylindrical body with a diameter which is adapted to the diameter of the transverse hole in the arm section and with a transverse threaded hole for receiving the bolt which is fitted in the connecting piece. In a second practical embodiment, bolts or nuts can be embedded firmly in the arm section. In a third practical embodiment, the arm section can be provided with one or more bodies which each have two or more threaded holes for retention of bolts.

If the means for fastening one or more bolts in an arm section are nuts fitted in transverse holes, the material thickness in the arm section can advantageously be increased up to the connecting surface against the connecting piece, so good safety is achieved in the stress level in the arm material where transverse holes are made for receiving nuts for arm assembly.

The two flanges of the connecting piece can be interconnected by an intermediate piece, for example in such a way that the flanges and the intermediate piece form a U-profile in cross section. A reinforcement can be made at the side of each hole, for example in the form of one or more ribs. Alternatively, the two flanges of the connecting piece can be interconnected by one or more intermediate pieces in the nature of ribs, the ribs alone constituting the firm connection between the flanges.

The connecting piece can be formed with an outer contour which essentially follows the contour of the arm. If the connecting piece is made in the form of a number of modules, these modules can be designed so that in combination they bring about an outer contour which essentially follows the contour of the arm. Alternatively, the connecting piece can, whether it is made in the form of one or more modules, be designed without special regard to the aerodynamic contour of the arm and in such a case the connecting piece can advantageously be covered with an aerodynamically shaped cover.

This aerodynamically shaped cover can either be integrated with one or both of the arm sections or can be made as a loose cover in one or more pieces, which is mounted over the connecting piece.

In its basic shape, the connecting piece is made so that it has no effect on the overall shape of the arm, but in a variant the connecting piece can be made so that the overall shape of the arm is changed in an appropriate direction which could be inappropriate in the case of an arm in one piece. For example, this may be in the form of a change in the longitudinal axis of the arm in the chord direction or in the form of a change in the longitudinal axis in the lift direction, or a combination of these with an angle change about an arbitrary axis.

A connecting piece according to the invention can be made from metal, for example cast iron or steel, or from a composite material, for example glass-fiber-reinforced epoxy, or from other materials.

The invention was developed for and has as a strong point use for windmill arms, but the invention is of general nature and can likewise be used for other types of arms.

BRIEF DESCRIPTION OF THE DRAWINGS

The invention is described in greater detail with reference to the drawing, in which FIG. 1 shows the positioning of a connecting piece inserted into an arm;

FIG. 2 shows a longitudinal section of a connecting piece inserted between two arm sections;

FIG. 3 shows a perspective illustration of a connecting piece;

FIG. 4 shows a perspective illustration of a connecting piece composed of a number of modules;

DETAILED DESCRIPTION OF THE INVENTION

Figure 5:
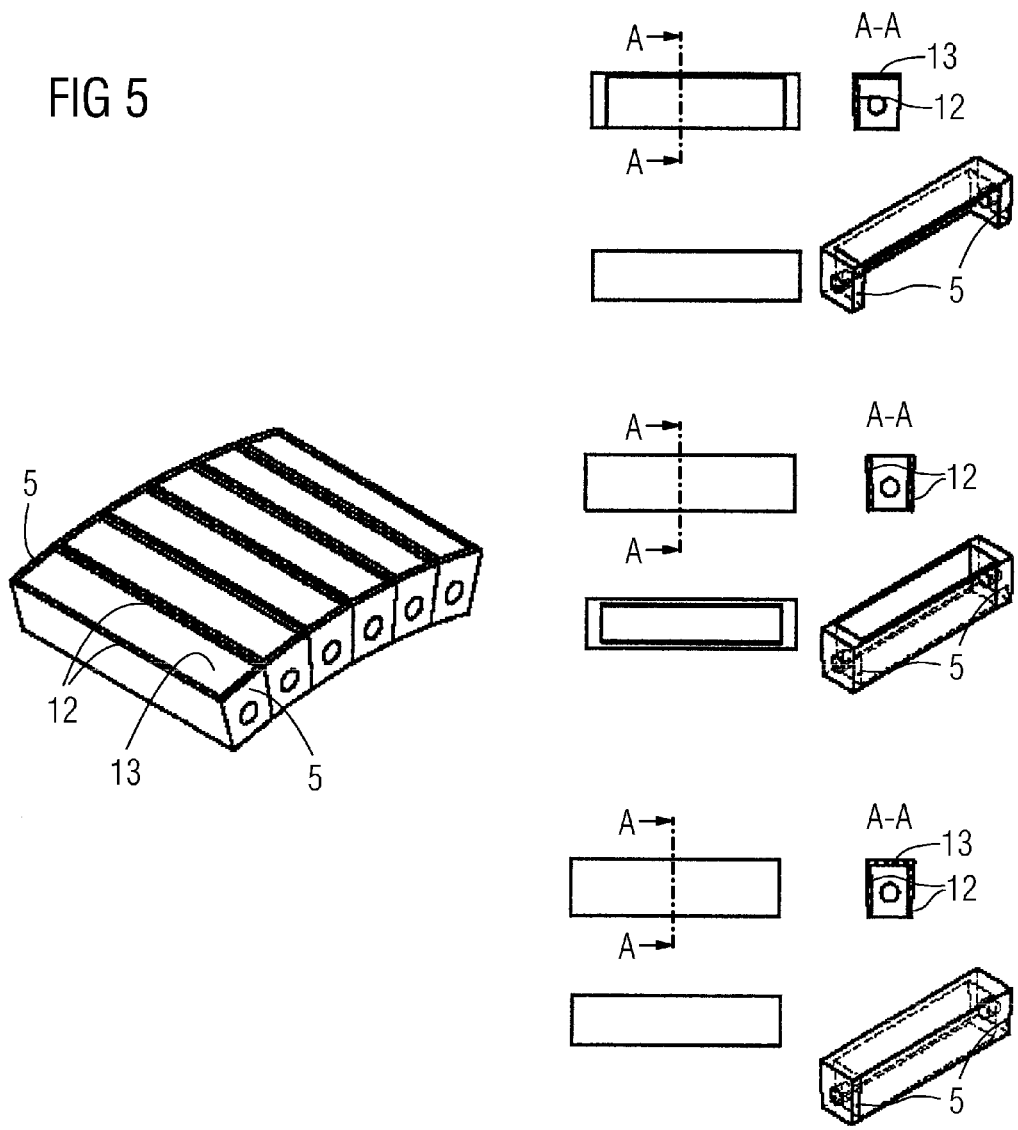
FIG. 5 shows a connecting piece composed of a number of identical modules.

FIG. 1 shows the positioning of a connecting piece 1 between two arm sections 2 and 3.

FIG. 2 shows a longitudinal section of an arm assembled according to the invention. The connecting piece 1 connects the two arm sections 2 and 3. One or more bolts 4 secure the flange 5 of the connecting piece to the arm section 2. The means of retaining the bolt in the arm section is shown here as a transverse nut 6, but the bolt can also be embedded firmly in the arm section, and the nut can also be firmly embedded, if appropriate longitudinally, so the thread is concentric with the longitudinal axis of the nut, or the thread can be provided in one or more larger bodies embedded in the arm section. The bolt can be provided with a head or can be made in the form of a threaded rod with a nut 7. The arm section can advantageously be made with increased material thickness 8 close to the connecting surface. If the arm section is provided with one or more shear webs 9, these can be made with a cutout 10 which improves access conditions at the connecting piece and reduces the stress concentrations when assembly takes place. Alternatively, one or more shear webs can be connected via the connecting piece which connects the arm shells or to one or more separate connecting pieces.

FIG. 3 shows a perspective illustration of a connecting piece 1 which is made with a shape which approximately follows the cross-sectional profile of the arm. The connecting piece 1 comprises a pair of flanges 5 for bearing against the two arm sections 2, 3 and a number of holes 11, through which bolts 4 for fastening the arm sections 2, 3 to the connecting piece 1 can be inserted. In order to achieve great rigidity, the flanges 5 are interconnected by ribs 12. Here, the connecting piece 1 is shown with an inward-facing flange, so the bolts 4 can be tightened and adjusted from inside, but the connecting piece 1 can also be made the other way round, so the bolts 4 can be tightened and adjusted from outside.

FIG. 4 shows a connecting piece 1 according to the invention which is divided into a number of modules 1', for example two modules as on the left-hand side of the figure or a number of modules 1" as on the right-hand side of the figure.

FIG. 5a shows an assembly according to the invention in which use is made of a larger number of modules 1", shown here as they would be mounted next to one another for the connection of two arm sections. Each module 1" consists here of two flanges 5, two ribs 12 and an outer part 13. When use is made of a larger number of modules 1", all the modules 1" can advantageously be identical, but they do not have to be so. Different embodiments are therefore shown in FIGS. 5b, 5c and 5d. The module in FIG. 5b has two flanges 5, one rib 12 and an outer part 13, the module in FIG. 5c has two flanges 5 and two ribs 12, and the module in FIG. 5d has two flanges 5, two ribs 12 and an outer part 13.

Figure 6:
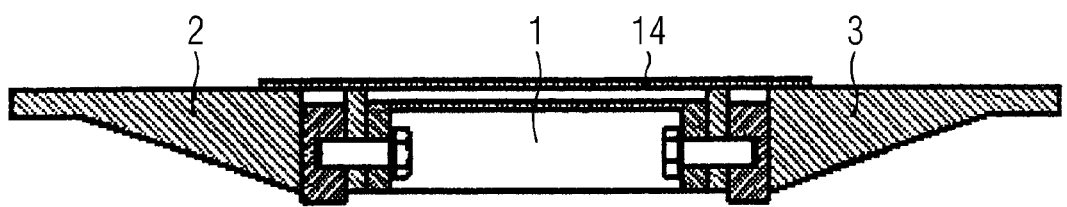
FIG. 6 shows a covering of a connecting piece, which does not have a profiled shape like the arm.

FIG. 6 shows an assembly according to the invention in which use is made of a connecting piece 1 in an embodiment which is not shaped approximately like the cross-sectional profile of the arm sections 2, 3. The connecting piece 1 is therefore covered by a cover 14, which is fastened to one or both of the arm sections 2 and 3. The cover 14 can also be fastened to the connecting piece 1 and can be in one or more pieces.

Figure 7:
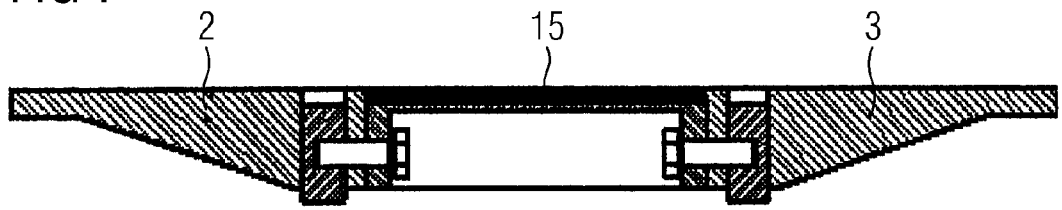
FIG. 7 shows an alternative covering of a connecting piece, which does not have a cross-sectional shape like the arm.

FIG. 7 also shows an assembly according to the invention in which use is made of a connecting piece 1 in an embodiment which is not shaped approximately like the cross-sectional profile of the arm sections. The connecting piece 1 is therefore covered by a cover 15 which is made as an integrated part of one or both of the arm sections 2 and 3.

Figure 8:
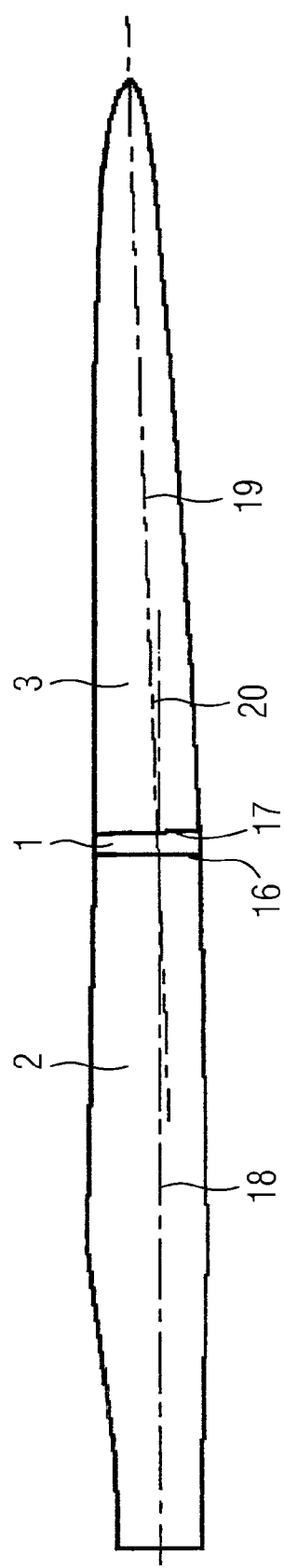
FIG. 8 shows an embodiment of a connecting piece which is used to change the overall shape of the arm in the chord direction.

FIG. 8 shows an assembly according to the invention in which the connecting piece is used in order to change the overall shape of the arm in the chord direction. Here, the connecting piece 1 between the two arm sections 2 and 3 is made with end surfaces 16 and 17 which have a relative alignment which results in the longitudinal axes 18 and 19 of the two joined-together sections forming an angle 20 which is not 0.

Figure 9:
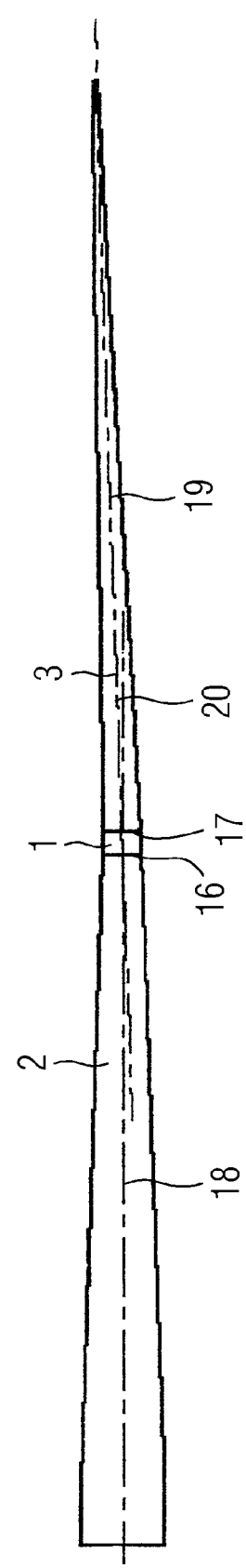
FIG. 9 shows an embodiment of a connecting piece which is used to change the overall shape of the arm in the lift direction.

FIG. 9 shows an assembly according to the invention in which the connecting piece is used in order to change the overall shape of the arm in a direction at right angles to the chord direction. Here, the connecting piece 1 between the two arm sections 2 and 3 is made with end surfaces 16 and 17 which are not parallel, which results in the longitudinal axes 18 and 19 of the two joined-together sections forming an angle 20 which is not 0.

The invention claimed is:

1. A method for assembling a first windmill arm section and a second windmill arm section in extension of one another to form at least a part of a windmill arm, comprising:
providing a connecting piece having a plurality of modules with a first flange for attachment to an end of the first windmill arm section and a second flange for attachment to an end of the second windmill arm section where the first and second flanges are firmly interconnected;
providing at least one hole for a bolt in the first and second flanges;
providing an individual bolt for the at least one bolt hole associated with the first and the second flanges; and
forming at least part of a windmill arm by attaching the first and second flanges of the connecting piece to the respective first and second windmill arm sections by inserting the respective bolt thorough the associated bolt hole and securing the bolt into the respective adjacent windmill arm section,
wherein the connecting piece which connects the two windmill arm sections is designed with end surfaces having a relative alignment resulting in the longitudinal axes of the two joined-together sections forming an angle which is not equal to 0.

2. The method as claimed in claim 1, wherein the connecting piece comprises an outer contour which, as a whole or composed of a number of modules, essentially follows the contour of the at least port of the windmill arm.

3. The method as claimed in claim 2, wherein the connecting piece which connects the two windmill arm sections is covered by an outer cover which, as a whole or composed of a number of pieces, essentially follows the contour of the at least port of the windmill arm.

4. The method as claimed in claim 3, wherein the outer cover is at least partly integrated in or joined together firmly with the arm shell on one of the windmill arm sections or on both windmill arm sections.

5. The method as claimed in claim 1, wherein at least one of the arm sections is provided with transverse holes fitted with nuts for the bolts where the nuts are formed as a cylindrical body with a diameter adapted to the diameter of the transverse hole in the at least one windmill arm section and the nuts are fainted with a transverse threaded hole for receiving the bolt fitted in the connecting piece.

6. The method as claimed in claim 1, wherein a material thickness in at least one of the windmill arm sections is increased up to the connecting surface against the connecting piece.

7. A connecting piece having a plurality of modules provided for assembling a first and a second windmill arm section in extension of one another to form at least a part of a windmill arm, comprising:
a first flange for attachment to the end of the first windmill arm section; and
a second flange for attachment to the end of the second windmill arm section, wherein the first and the second flanges are firmly interconnected, and the first and the second flanges are each provided with at least one hole for a bolt which extends through the hole from the connecting piece and into the adjacent windmill arm section in order to secure each windmill arm section to the adjacent flange,
wherein the connecting piece is designed with end surfaces have a relative alignment that results in the longitudinal axes of the two joined-together sections forming an angle that is not 0.

8. The connecting piece as claimed in claim 7, wherein the connecting piece has an outer contour composed of a plurality of modules essentially follows the contour of the at least part of the arm.

9. The connecting piece as claimed in claim 8, wherein the connecting piece is covered by an outer cover which, as a whole or composed of a plurality of pieces, essentially follows the contour of the at least part of the arm.

10. The connecting piece as claimed in claim 9, wherein the outer cover is at least partly integrated in or joined together firmly with the arm shell on one or both of the windmill arm sections.

11. The connecting piece as claimed in claims 8, wherein the connecting piece in combination with an outer cover essentially follows the contour of the at least part of the arm.

12. The connecting piece as claimed in claim 11, wherein the connecting piece along with the outer cover is at least partly integrated with or joined together firmly with the arm shell on at least one of the windmill arm sections.

* * * * *